US011908007B2

(12) United States Patent
Foley et al.

(10) Patent No.: US 11,908,007 B2
(45) Date of Patent: Feb. 20, 2024

(54) SYSTEMS AND METHODS FOR DYNAMICALLY VISUALIZING POTENTIAL TRADE OUTCOMES BASED ON REAL-TIME OPTIONS PRICE DATA

(71) Applicant: Options AI, LLC, New York, NY (US)

(72) Inventors: John L. Foley, East Hampton, NY (US); Alexander Griffiths, Arlington Heights, IL (US); Calvin C. Lagator, Boulder, CO (US); Demetrios Lyristis, New York, NY (US)

(73) Assignee: OptionsAI, LLC, New York, NY (US)

( * ) Notice: Subject to any disclaimer, the term of this patent is extended or adjusted under 35 U.S.C. 154(b) by 0 days.

(21) Appl. No.: 16/995,068

(22) Filed: Aug. 17, 2020

(65) Prior Publication Data

US 2021/0056629 A1 Feb. 25, 2021

Related U.S. Application Data

(60) Provisional application No. 62/888,672, filed on Aug. 19, 2019.

(51) Int. Cl.

| G06Q 40/04 | (2012.01) |
|---|---|
| G06Q 10/10 | (2023.01) |
| G06Q 20/04 | (2012.01) |
| G06F 16/26 | (2019.01) |
| G06T 11/20 | (2006.01) |
| G06N 7/01 | (2023.01) |
| G06F 3/0482 | (2013.01) |
| G06F 3/0486 | (2013.01) |

(52) U.S. Cl.
CPC ............ *G06Q 40/04* (2013.01); *G06F 16/26* (2019.01); *G06N 7/01* (2023.01); *G06Q 10/10* (2013.01); *G06Q 20/0457* (2013.01); *G06T 11/206* (2013.01); *G06F 3/0482* (2013.01); *G06F 3/0486* (2013.01); *G06T 2200/24* (2013.01)

(58) Field of Classification Search
CPC .... G06Q 40/04; G06Q 10/10; G06Q 20/0457; G06F 16/26; G06F 3/0482; G06F 3/0486; G06N 7/005; G06T 11/206; G06T 2200/24
USPC ...................................................... 705/3–44
See application file for complete search history.

(56) References Cited

U.S. PATENT DOCUMENTS

| 6,493,681 | B1 * | 12/2002 | Tertitski | ................. | G06Q 40/04 |
|---|---|---|---|---|---|
| | | | | | 705/37 |
| 7,774,247 | B2 | 8/2010 | Hausman et al. | | |
| 8,612,329 | B1 * | 12/2013 | Steidlmayer | ........... | G06Q 40/04 |
| | | | | | 705/37 |
| 9,508,101 | B1 * | 11/2016 | Buchheit | ................ | G06Q 40/04 |
| 2003/0009411 | A1 * | 1/2003 | Ram | ...................... | G06Q 40/06 |
| | | | | | 705/37 |

(Continued)

OTHER PUBLICATIONS

Gu, Anthony Yanxiang, "A New Stock Option Plan and its Valuation", Allied Academies International Conference, Academy of Accounting and Financial Studies, Proceedings 6.1: 65-70., Jordan Whitney Enterprises, Inc., (Year: 2001).*

(Continued)

*Primary Examiner* — Frantzy Poinvil
(74) *Attorney, Agent, or Firm* — Carlton Fields, PA; Eleanor M. Yost

(57) ABSTRACT

This invention relates to systems and methods for processing and visualizing data related to trading strategies for exchange-traded equities based upon real-time options data.

15 Claims, 12 Drawing Sheets

(56) References Cited

U.S. PATENT DOCUMENTS

| | | | |
|---|---|---|---|
| 2003/0139989 A1* | 7/2003 | Churquina | G06Q 40/00 705/35 |
| 2004/0133500 A1* | 7/2004 | Thompson | G06Q 40/04 705/37 |
| 2007/0078745 A1* | 4/2007 | Kalt | G06Q 40/06 705/36 R |
| 2009/0125448 A1* | 5/2009 | Borkovec | G06Q 40/04 705/36 R |
| 2010/0070431 A1* | 3/2010 | Kaylie | G06Q 40/06 705/36 R |
| 2010/0293110 A1 | 11/2010 | Rosenthal et al. | |
| 2012/0246053 A1* | 9/2012 | McKeon | G06Q 40/04 705/37 |
| 2013/0138577 A1* | 5/2013 | Sisk | G06Q 40/04 705/36 R |
| 2014/0172751 A1* | 6/2014 | Greenwood | G06Q 40/06 705/36 R |
| 2015/0095260 A1* | 4/2015 | Ma | G06Q 40/06 705/36 R |
| 2015/0332396 A1 | 11/2015 | Khuntia et al. | |
| 2016/0196606 A1* | 7/2016 | Damodaran | G06Q 40/04 705/37 |
| 2016/0371775 A1 | 12/2016 | Sandow et al. | |
| 2017/0161821 A1* | 6/2017 | Wang | G06Q 30/0641 |
| 2018/0130077 A1* | 5/2018 | Crabtree | G06Q 30/0205 |
| 2019/0026830 A1* | 1/2019 | Powell | G06Q 40/06 |
| 2020/0273104 A1* | 8/2020 | Ushman | G06Q 40/06 |

OTHER PUBLICATIONS

Stoll, et al., "Commodity Index Investing and Commodity Futures Prices", Journal of Applied Finance 20.1: 7-46, Financial Management Association International (Year: 2010).*

Fintech Sandbox Demo Day Presentation from Apr. 18, 2018.

Outline of Presentation from Fintech Sandbox Demo Day from Apr. 18, 2018.

Options.AI Investor Presentation Materials from the 4th Quarter 2017—1st Quarter of 2018.

* cited by examiner

Apple Inc. - Common Stock  
Jun 21 2019 Expiry - Options Chain

| | | | | CALLS | | | | | | | | | PUTS | | | | |
|---|---|---|---|---|---|---|---|---|---|---|---|---|---|---|---|---|---|
| Delta | Imp. Vol | Op int | Vol | Change | Last | Bid | Ask | Strike | Bid | Ask | Last | Change | Vol | Op int | Imp. Vol | Delta |
| 0.991 | 120.602 | 2 | 0 | 3.21 | 120.75 | 108.75 | 110.95 | 80 | 0 | 0.02 | 0.01 | 0.01 | 0 | 1,134 | 97.857 | ~0.001 |
| 0.998 | 117.285 | 0 | 0 | 0 | 115.3 | 102.05 | 105.8 | 85 | 0 | 0.02 | 0.01 | 0.01 | 0 | 1,322 | 80.573 | ~0.001 |
| 1 | ~ | | 0 | 0 | 3.43 | 111 | 97 | 100.3 | 90 | 0 | 0.01 | 0.01 | 0.01 | 0 | 1,102 | 0 | 0 |
| 0.99 | 95.931 | 0 | 0 | 2.83 | 105.41 | 91.9 | 95.75 | 95 | 0 | 0.01 | 0.01 | 0.01 | 0 | 1,110 | 0 | 0 |
| 0.984 | 97.881 | 229 | 173 | 2.36 | 89.4 | 88.8 | 89.2 | 100 | 0 | 0.01 | 0.01 | 0.01 | 0 | 5,364 | 0 | 0 |
| 0.985 | 87.795 | 0 | 90 | 3.4 | 84.4 | 83.7 | 84.15 | 105 | 0 | 0.01 | 0.01 | 0.01 | 0 | 17,447 | 0 | 0 |
| 0.978 | 87.63 | 4 | 0 | 2.52 | 90.15 | 77 | 81.2 | 110 | 0 | 0.01 | 0.01 | ~0.01 | 1 | 5,681 | 0 | 0 |
| 0.979 | 78.524 | 0 | 0 | 2.8 | 85.45 | 72 | 78.05 | 115 | 0.01 | 0.02 | 0.01 | 0 | 25 | 3,745 | 54.321 | ~0.002 |
| 0.976 | 73.828 | 118 | 1 | 3.91 | 69.45 | 68.9 | 69.25 | 120 | 0.02 | 0.03 | 0.02 | ~0.01 | 911 | 26,247 | 51.376 | ~0.003 |
| 0.975 | 67.648 | 71 | 186 | 1.57 | 64.2 | 63.85 | 64.3 | 125 | 0.04 | 0.05 | 0.05 | ~0.03 | 150 | 17,839 | 50.621 | ~0.005 |
| 0.97 | 63.696 | 36 | 0 | ~3.52 | 59.72 | 57 | 61.3 | 130 | 0.08 | 0.09 | 0.09 | ~0.05 | 660 | 12,877 | 49.53 | ~0.008 |
| 0.947 | 54.704 | 49 | 0 | ~10.75 | 51.7 | 53.4 | 54.65 | 135 | 0.11 | 0.13 | 0.13 | ~0.05 | 206 | 7,671 | 46.984 | ~0.012 |
| 0.962 | 53.897 | 149 | 0 | ~11.53 | 46 | 49.05 | 49.4 | 140 | 0.16 | 0.18 | 0.18 | ~0.08 | 603 | 10,875 | 44.684 | ~0.016 |
| 0.955 | 49.666 | 191 | 0 | ~10.55 | 42.7 | 44.1 | 44.5 | 145 | 0.23 | 0.25 | 0.23 | ~0.19 | 393 | 8,518 | 452.378 | ~0.024 |
| 0.945 | 46.155 | 1,436 | 34 | 2.5 | 39.7 | 39.25 | 39.6 | 150 | 0.32 | 0.35 | 0.34 | ~0.23 | 1,109 | 16,133 | 40.032 | ~0.033 |
| 0.932 | 42.287 | 6,716 | 41 | 2.1 | 34.7 | 34.4 | 34.7 | 155 | 0.45 | 0.49 | 0.48 | ~0.35 | 314 | 16,091 | 37.647 | ~0.047 |
| 0.912 | 39.161 | 9,600 | 58 | 2.75 | 30.45 | 29.6 | 29.95 | 160 | 0.66 | 0.69 | 0.69 | ~0.55 | 841 | 15,305 | 35.456 | ~0.067 |
| 0.885 | 36.141 | 7,327 | 120 | 2.95 | 25.75 | 24.9 | 25.25 | 165 | 0.95 | 1 | 0.94 | ~0.79 | 816 | 11,264 | 33.326 | ~0.097 |
| 0.843 | 33.787 | 13,957 | 370 | 2.27 | 21 | 20.45 | 20.7 | 170 | 1.43 | 1.48 | 1.44 | ~1.04 | 44,639 | 49,129 | 31.538 | ~0.141 |
| 0.784 | 31.761 | 9,685 | 183 | 1.55 | 16.65 | 16.2 | 16.45 | 175 | 2.17 | 2.24 | 2.19 | ~1.36 | 3,276 | 14,175 | 30.031 | ~0.203 |
| 0.704 | 30.135 | 13,544 | 7,705 | 1.84 | 12.83 | 12.3 | 12.6 | 180 | 3.25 | 3.35 | 3.22 | ~1.82 | 9,894 | 20,474 | 28.895 | ~0.287 |
| 0.605 | 28.573 | 75,131 | 2,302 | 0.9 | 9 | 8.9 | 9.1 | 185 | 4.8 | 4.95 | 4.85 | ~2.01 | 4,545 | 78,258 | 27.356 | ~0.391 |
| 0.49 | 27.358 | 14,706 | 4,405 | 0.62 | 6.15 | 6.05 | 6.25 | 190 | 6.9 | 7.05 | 7 | ~2.3 | 7,347 | 16,068 | 26.025 | ~0.512 |
| 0.368 | 26.198 | 11,733 | 3,450 | 0.27 | 3.92 | 3.8 | 3.95 | 195 | 9.6 | 9.85 | 9.35 | ~3.08 | 832 | 21,435 | 24.832 | ~0.64 |
| 0.256 | 25.325 | 22,127 | 5,140 | 0.09 | 2.3 | 2.25 | 2.34 | 200 | 13.05 | 13.3 | 13 | ~3.25 | 1,457 | 20,524 | 23.984 | ~0.758 |
| 0.166 | 24.928 | 16,947 | 3,325 | 0.02 | 1.34 | 1.25 | 1.34 | 205 | 17.1 | 17.35 | 17.2 | ~2.75 | 271 | 14,773 | 23.481 | ~0.851 |
| 0.103 | 24.985 | 18,342 | 2,702 | ~0.04 | 0.73 | 0.71 | 0.74 | 210 | 21.55 | 21.85 | 21.25 | ~2.7 | 447 | 16,641 | 23.423 | ~0.91 |
| 0.064 | 25.48 | 18,350 | 1,476 | ~0.03 | 0.42 | 0.4 | 0.44 | 215 | 26.3 | 26.65 | 25.75 | ~3.62 | 217 | 8,787 | 24.807 | ~0.931 |
| 0.041 | 26.356 | 48,984 | 3,034 | ~0.02 | 0.26 | 0.25 | 0.27 | 220 | 31.15 | 31.55 | 31.18 | ~2.12 | 416 | 30,112 | 27.084 | ~0.936 |
| 0.027 | 27.27 | 13,822 | 1,904 | 0 | 0.017 | 0.16 | 0.17 | 225 | 36.15 | 36.55 | 36.22 | ~1.13 | 113 | 1,678 | 31.223 | ~0.931 |
| 0.018 | 28.368 | 21,799 | 113 | ~0.01 | 0.11 | 0.1 | 0.12 | 230 | 41.2 | 41.55 | 41.35 | ~0.9 | 257 | 455 | 35.708 | ~0.925 |
| 0.012 | 29.172 | 10,427 | 818 | 0 | 0.06 | 0.06 | 0.08 | 235 | 46.2 | 46.55 | 47.9 | ~1.92 | 1 | 9 | 39.752 | ~0.92 |
| 0.009 | 30.279 | 12,158 | 76 | ~0.02 | 0.04 | 0.04 | 0.06 | 240 | 51.15 | 51.5 | 53.4 | 1015 | 0 | 2 | ~ | ~1 |
| 0.005 | 30.355 | 6,299 | 10 | ~0.02 | 0.02 | 0.02 | 0.03 | 245 | 54.25 | 58.05 | 49.1 | 0.6 | 0 | 0 | ~ | ~1 |
| 0.004 | 31.738 | 12,205 | 13 | 0 | 0.02 | 0.01 | 0.03 | 250 | 61.15 | 61.55 | 60.9 | ~3.38 | 6 | 3 | 51.681 | ~0.966 |
| 0.004 | 34.12 | 11,681 | 0 | 0 | 0 | 0.02 | 0.03 | 255 | 64.15 | 68.35 | 63 | 25.18 | 0 | 0 | ~ | ~1 |
| 0.002 | 34.186 | 12,596 | 0 | ~0.01 | 0.01 | 0 | 0.02 | 260 | 71.15 | 71.55 | 70.9 | ~1.17 | 10 | 6 | 59.914 | ~0.897 |
| 0 | 0 | 11,555 | 0 | 0 | 0.01 | 0 | 0.01 | 265 | 75.25 | 77.9 | 92.8 | 24.98 | 0 | 0 | ~ | ~1 |
| 0 | 0 | 11,427 | 0 | 0.01 | 0.01 | 0 | 0.01 | 270 | 79.15 | 93.1 | 99.5 | 26.68 | 0 | 0 | ~ | ~1 |
| 0 | 0 | 7,374 | 0 | 0.01 | 0.01 | 0 | 0.01 | 275 | 84.15 | 88.1 | 87.95 | 10.13 | 0 | 0 | ~ | ~1 |
| 0 | 0 | 3,289 | 0 | 0.01 | 0.01 | 0 | 0.01 | 280 | 90.05 | 92.75 | 62.53 | ~20.29 | 0 | 0 | 76.724 | ~0.876 |
| 0 | 0 | 3,516 | 0 | 0.01 | 0.01 | 0 | 0.01 | 285 | 84.55 | 98.5 | 68.65 | ~19.17 | 0 | 0 | 81.968 | ~0.869 |
| 0 | 0 | 10,251 | 0 | 0.01 | 0.01 | 0 | 0.01 | 290 | 99.55 | 103.35 | 70.48 | ~22.34 | 0 | 0 | 85.309 | ~0.865 |
| 0 | 0 | 3,477 | 0 | 0.01 | 0.01 | 0 | 0.01 | 295 | 104.25 | 108.5 | 123.9 | 26.08 | 0 | 0 | 88.691 | ~0.861 |
| 0 | 0 | 5,636 | 0 | 0.01 | 0.01 | 0 | 0.01 | 300 | 108.15 | 113.5 | 145.51 | 42.89 | 0 | 0 | ~ | ~1 |
| 0.001 | 49.298 | 653 | 0 | 0.01 | 0.01 | 0 | 0.02 | 210 | 119.25 | 123.5 | 139.48 | 26.66 | 0 | 0 | 100.896 | ~0.845 |
| 0.001 | 52.512 | 435 | 0 | 0.01 | 0.01 | 0 | 0.02 | 320 | 129.15 | 133.3 | 0 | 0 | 0 | 0 | ~ | ~1 |
| 0 | 0 | 680 | 0 | 00.01 | 0.01 | 0 | 0.01 | 330 | 139.2 | 143.5 | 0 | 0 | 0 | 0 | 116.978 | ~0.824 |
| 0 | 0 | 3,111 | 0 | 0.01 | 0.01 | 0 | 0.01 | 340 | 149.35 | 153.25 | 130.1 | ~12.72 | 0 | 0 | ~ | ~1 |

FIG. 1

TRADE SUMMARY AT INCEPTION

Buy X $XXX Call (MM/DD/YY)

| Create Data | Target Price/Date | Trade Profile |
|---|---|---|
| MM/DD/YY - XX days ago | $XXX by (MM/DD/YY) in XX days | Risk $XXX to make $XXX at target |

Follow Trade

Trade Description
Lorem ipsum dolor sit amet, consectetur adipiscing elit. Ut et leo ut leo lobortis interdum. Aenean sodales risus risus, eget sagittis nibh tincidunt non. Cras et egestas tellus. Ut vestibulum bibendum messa at ultricies.

UPDATED SUMMARY

|  | At Creation | Now |
|---|---|---|
| Days to Expiry | XX Days | YY Days |
| Trade Price | $XXX | $XXX (+$YYY) |
| Current Returns | - | XXX % |
| Likelihood of Breakeven | XXX % | XXX % |
| Likelihood of Target | XXX % | XXX % |

FIG. 9

SYSTEMS AND METHODS FOR DYNAMICALLY VISUALIZING POTENTIAL TRADE OUTCOMES BASED ON REAL-TIME OPTIONS PRICE DATA

CROSS-REFERENCE TO RELATED APPLICATIONS

This application claims priority from, and incorporates by reference in its entirety, U.S. Provisional Patent Application Ser. No. 62/888,672, filed Aug. 19, 2019, entitled "Systems and Methods for Dynamically Visualizing Potential Trade Outcomes Based on Real-Time Options Price Data."

FIELD OF THE INVENTION

The inventions described herein relate to systems and methods for constructing, comparing, and trading of equity and equity derivative securities.

BACKGROUND OF THE INVENTION

The present invention relates to systems and methods, and particularly to computer systems and computer-implemented methods, for use in the financial services field, and more particularly for processing and visualizing data related to trading strategies for exchange-traded equities and equity options, based upon real-time options data.

An options contract (an "option") provides a right to buy or sell an underlying tradeable object or asset, such as a security or futures contract, for a certain price at a subsequent date. For example, when the option is exercised, the underlying security is purchased or sold. Often, there are a large number of options available for an underlying tradeable object at the electronic exchange.

In developing a trading strategy based on options, a trader may wish to view details about the options and the underlying tradeable objects as well as information about available options and underlying tradeable objects over an extended period of time (e.g., for one or more upcoming months). But formulating, comparing, and selecting options strategies for trade execution is an overwhelming and cumbersome process when using the existing methods provided by broker-dealers. Non-professional traders without custom built financial models have difficulty assimilating information from a number of disparate sources and making a series of rational choices based upon probability calculations, before arriving at a best-fit trade strategy.

Exchange traded equity options price data, in particular, is both voluminous and complex in its derivation. The standard format for presenting this data on an analytic or trading platform is through an "options chain" or "options matrix." An options chain is a listing of all available option contracts, both puts and calls, for a given security. It shows all puts, calls, strike prices, and pricing information for a single underlying asset within a given maturity period.

FIG. 1 depicts a typical "straddle" format options chain 100, which contains options price data for both call and put options at each available "strike" price with an options expiry date of Jun. 21, 2019. The data in options chain 100 may be construed as a synthesis of all forward looking (in this example, through to Jun. 21, 2019) views or opinions on the future price movement of stock shown. In other words, embedded in options chain 100 is data that represents the real-time expectations and consensus of the trading crowd, where real money is being risked on the outcome of stock's future price movement. But manually deciphering this information, formulating a probability-based price target, selecting and comparing available strategies, and executing and ultimately managing a trade strategy is challenging and time-consuming and continually subject to the inherent risk of human error.

Some existing technologies incorporate features to generate options strategies. They may also require multiple inputs by a user to generate precise and specific trade strategies. Alternatively, some existing technologies only require a single input by a user, but are configured or operable to generate non-specific, sample strategies. Other technologies may require the user to add or change inputs for each strategy type.

One previously existing technology in the field was called "StrategySeek" by eTrade. StrategySeek presents a graphical depiction of past/future price. StrategySeek also permits a user to select a desired future price target on a graphical interface as one input in strategy. However, the graphical depiction of a "future" price is not based upon real-time expected move calculations (e.g., a bullish/bearish consensus), but rather, a static probability cone based upon a user's own input of implied volatility. And there is no inclusion of catalyst event data (earnings announcements, dividends, stock splits). Actual strategy construction requires further user inputs (including implied volatility, risk prioritization, etc.). This product therefore does not offer "single input" strategy construction and pre-supposes significant user experience and knowledge for effective use. Further, StrategySeek does not provide an interactive, real-time, dynamic graphical element for post-trade management.

There is therefore a need for a system and method for displaying option and option trading data within an option chain in a clear, concise, and informative manner so that traders can identify potential risk and trading opportunities more efficiently and effectively. There is also a need for a computerized system that aggregates real-time options market data in conjunction with processing real-time calculated analytics and then displaying them in dynamic graphical and numerical form. Such a system and method would make the advantages of options market information and sophisticated options strategies available to those otherwise restricted by time or experience. Such a system and method would further specifically address some of the following problems inherent to the options market and options trading: (i) difficulty and delay when interpreting voluminous and complex options data; (ii) lack of accessibility to sophisticated strategies; (iii) ability to select options strike prices and compare strategies; and (iv) efficient post-trade management.

There is further a need for systems and methods that utilize a dynamic, interactive, real-time expected move chart as a graphical interface for user price target and other inputs. In addition, there is a need for systems and methods incorporating dynamic visualizations of trade payouts and outcome probabilities on the same graphical interface as used to construct the trade, which would represent a new system and method of assisting with post-trade management.

BRIEF DESCRIPTION OF THE DRAWINGS

The invention is disclosed with reference to the accompanying drawings, wherein:

FIG. 1 is a schematic illustration of an exemplary options matrix as known in the art;

FIG. 9 is a detail of the exemplary post-trade management visualization of FIG. 8;

Corresponding reference characters indicate corresponding parts throughout the several views. The examples set out herein illustrate several embodiments of the invention but should not be construed as limiting the scope of the invention in any manner.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems and methods for processing of data relating to options. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 2:
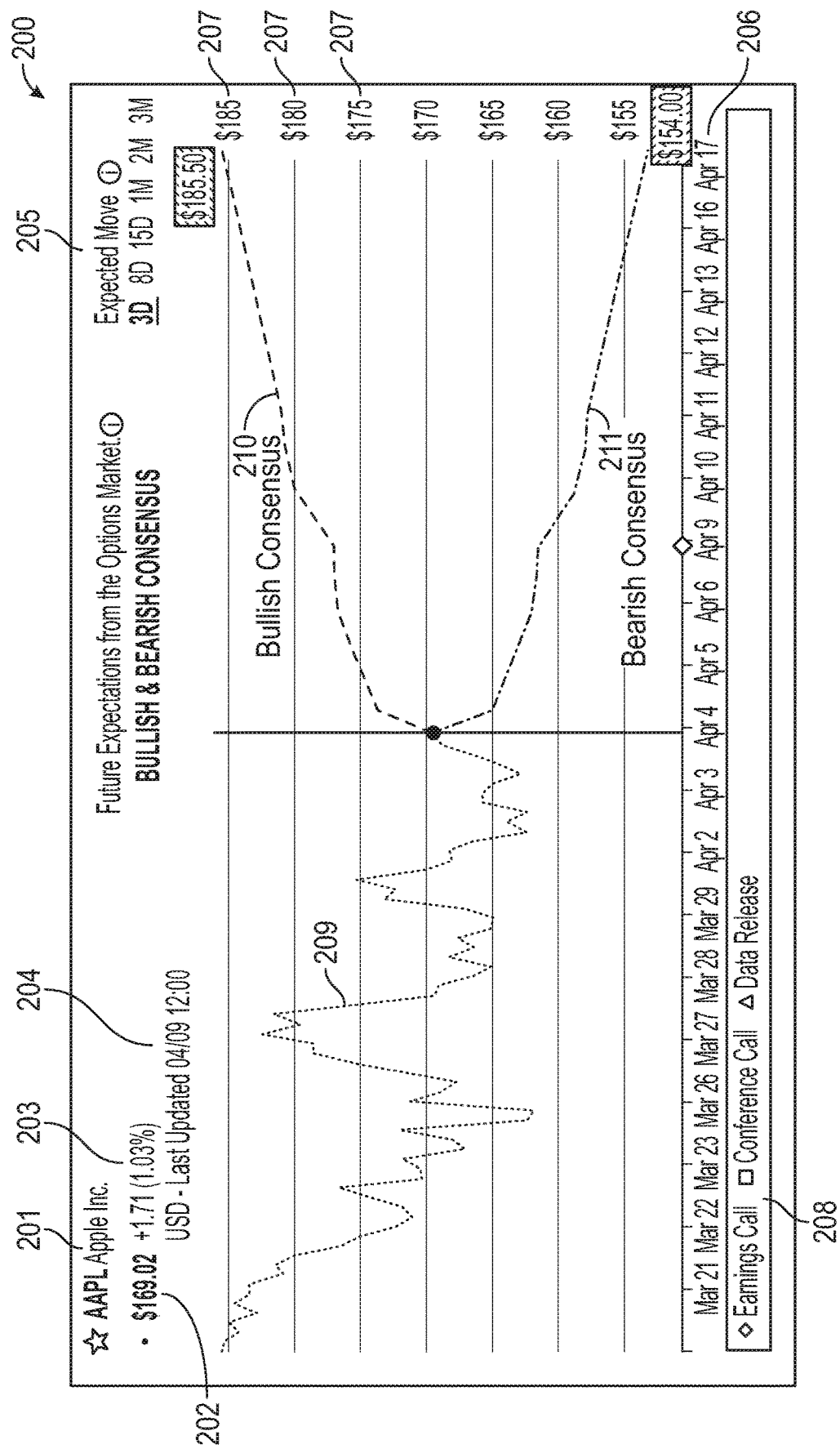
FIG. 2 is an illustration of an exemplary visualization in accordance with an embodiment of the invention.

Referring now to FIG. 2, an example view of an interactive options market information visualization tool 200, created in accordance with an embodiment of the invention is shown. Visualization tool 200 includes company identifying information 201, e.g., company name and ticker symbol, as well as current stock price 202, daily stock price change or percent change 203, and the currency, date and time 204 that the current stock price 202 was updated.

Visualization tool 200 further includes event indicator 208, which may be any number of pre-populated events that are likely to impact the price of an equity (e.g., earnings reports or calls; FDA rulings; new product releases; litigation; etc.). The occurrence of such an event is represented on visualization tool 200 using symbols that correspond to the event date, as shown, for example, in FIG. 2 with a diamond shape on April 9, indicating an earnings call is scheduled to occur on that day. Other symbols, colors, or indicators may be used. During such events, users would expect an increase in the option's implied volatility and therefore an increase in the option pricing. When the implied volatility is high, that means that the market anticipates a greater movement in the stock price.

Visualization tool 200 further includes expected move selector 205, which permits a user to select from a plurality of pre-populated time periods for which to calculate stock price "expected move" or "implied move," and represent the results in visualization tool 200, e.g., as lines on a graph or similar chart. In one embodiment, the expected move is derived from options prices. In the example shown, the expected move selector 205 is set to "3D," or three days. Other options may be eight days, fifteen days, or any number of days, or one, two or three or more months, or another time period pre-populated and/or selected by a user.

In this embodiment, visualization tool 200 presents a "real-time" bullish 210 and bearish 211 "expected move" consensus derived from real-time options prices for several dates, shown on date axis 206.

Figure 3:
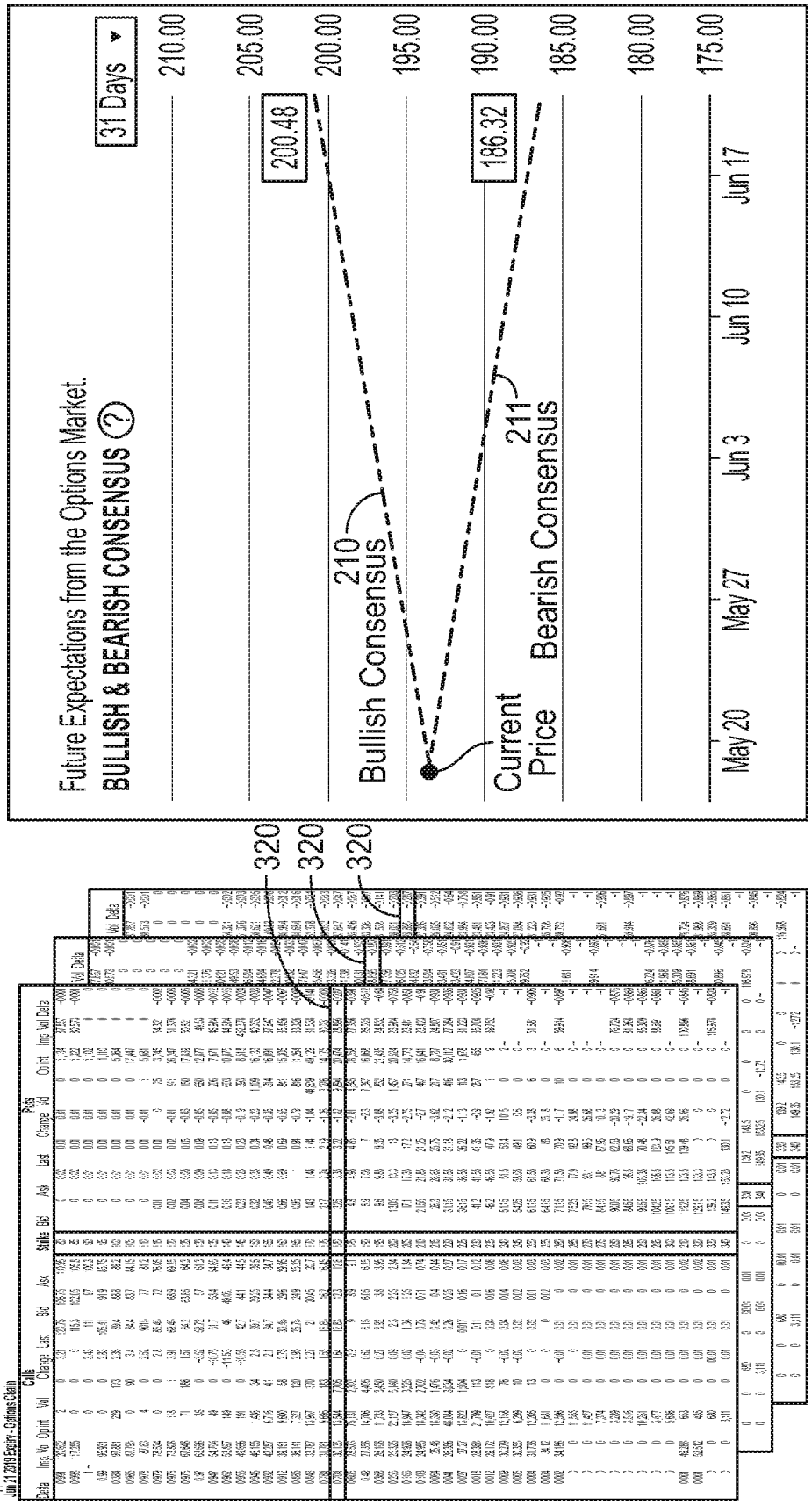
FIG. 3 is an illustration of how the expected move portion of the visualization is derived in accordance with an embodiment of the invention.

FIG. 3 illustrates how the bullish 210 (upward) and bearish 211 (downward) consensus of future expected stock price movement over time can be calculated by the system of the invention from options data that would be typically represented in several options matrices 310 for each relevant expiry date. In one embodiment, at-the-money (ATM) call and put options prices are extracted in step 320. Next, an 85% "dampener" is applied to derive the expected move. For example, in one embodiment, the expected move of a stock for can be found by calculating 85% of the value of the front month at the money (ATM) straddle, adding the price of the front month ATM call and the price of the front month ATM put, then multiplying this value by 85%. Given the dynamic and fast-moving nature of options prices, it would not be possible to manually perform the number of calculations required to generate visualization tool 200's expected move analysis for several dates without the data output likely being immediately stale.

Turing back to FIG. 2, a range of prices are illustrated on price axis 207. Visualization tool 200 further presents a graph or chart illustrating the selected stock's past performance 209, and current price, as indicated with a solid dot or maneuverable click-and-drop "pin" and a vertical line separating the graphical illustration of past performance 209 from the bullish 210 and bearish 211 expected move consensus representations.

Figure 4B:
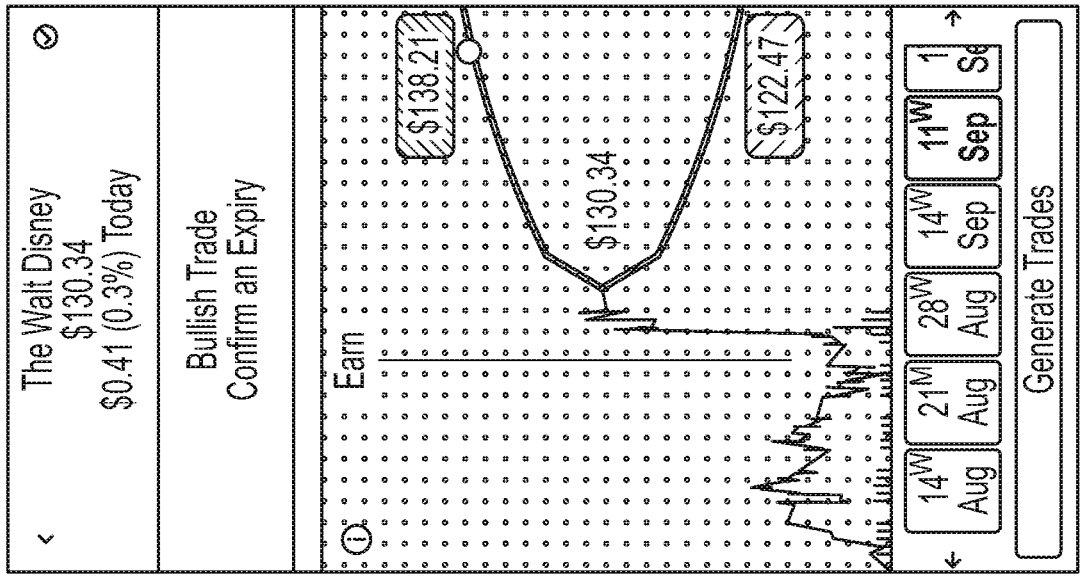
FIG. 4B is an illustration of a target price visualization generated in accordance with a user's selected market sentiment from the menu illustrated in FIG. 4A.
Figure 4A:
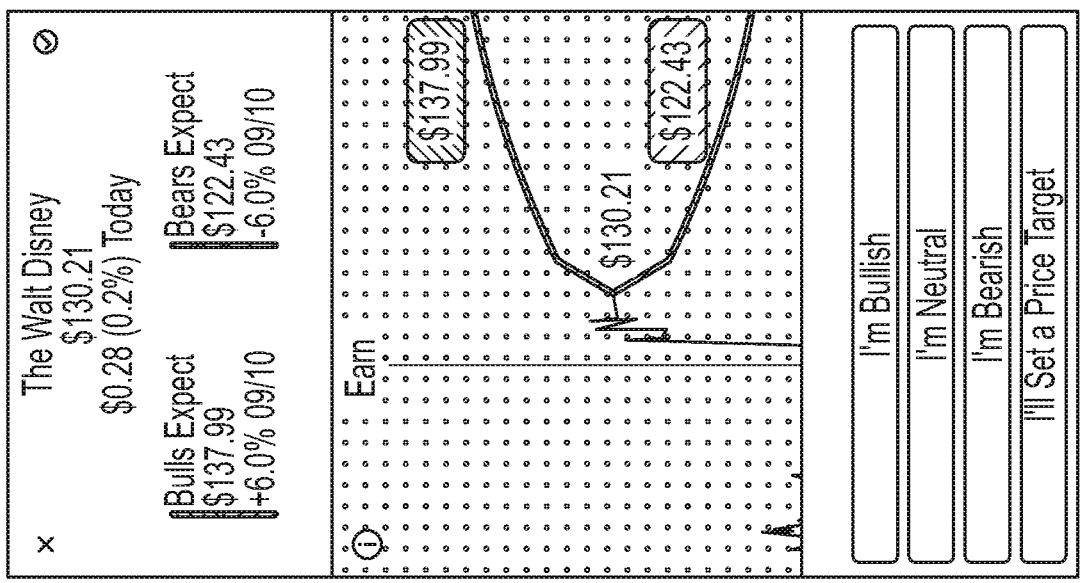
FIG. 4A is an illustration of an exemplary user menu used to generate a target price in accordance with an embodiment of the invention.
Figure 4C:
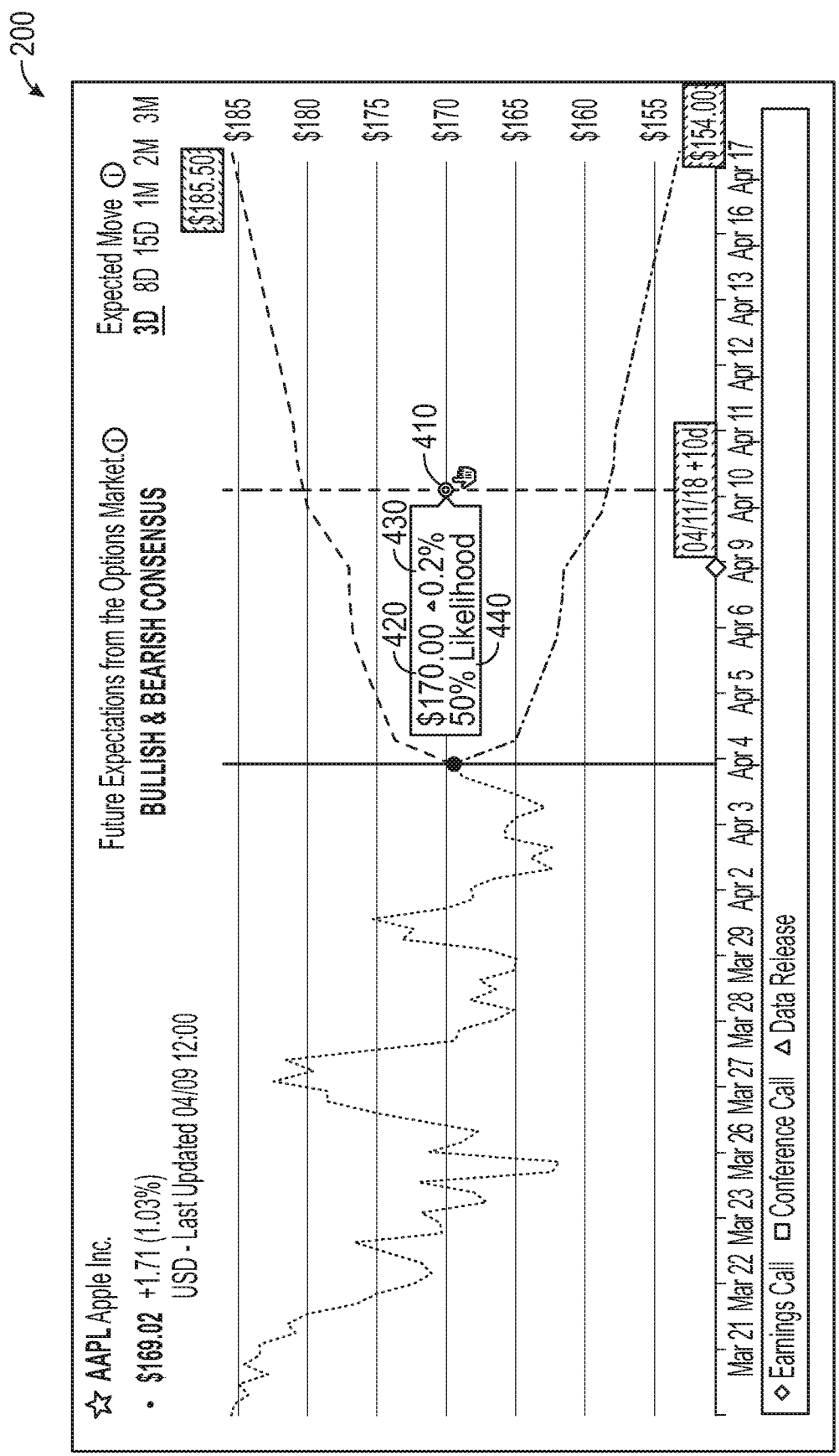
FIG. 4C is another illustration of an exemplary visualization detailing additional information displayed in connection with a user's selected target price in accordance with an embodiment of the invention.

Once the values for expected move are calculated and visually rendered on visualization tool 200, a user can interact with visualization tool 200 using a selection tool 410. e.g., a mouse indicator or a touch. In one embodiment, a user may indicate a market sentiment to automatically generate a price target selection, as illustrated in FIGS. 4A and 4B. A user may, for example, select the button "I'M BEARISH" or "I'M NEUTRAL" or "I'M BULLISH," and visualization tool 200 will generate a price target selection that corresponds to the bullish expected move consensus, the current underlying security price, or the bearish expected move consensus, as appropriate. In another embodiment, a user can select a price target directly by, for example, selecting "I'll Set A Price Target," as illustrated in FIG. 4A. Once the price target is selected by any of these methods, visualization tool 200 will then prompt the user to select an expiry date (or duration). In another embodiment, visualization tool 200 is operablecreate a hypothetical trading scenario, as illustrated in FIG. 4C. In one example, if a user wished to view trade details for a given date. e.g., April 10, and a given price target 420, e.g., $170.00, the user could click on visualization tool 200 using selection tool 410 at the position corresponding to that date along date axis 206 and price axis 207, and additional details will be provided. e.g., in a pop-up box or menu, including the price target 420, the percent higher or lower price target 420 is compared to the current stock price 202, e.g., 0.2% higher as shown, and the probability of outcome 440. Probability of outcome 440 is determined in one embodiment by calculating delta, which is defined as nearest strike of call to the upside and put to the downside, then smoothed across expirations and strikes. A user can selectively click anywhere on the expected move graph represented on visualization tool 200 to access these additional details.

In another embodiment, a user is able to click, using a selection tool 410, and "drag" the current price pin to any point along the date axis 206 and release or "drop" to set price target 420. The probability of outcome 440 dynamically updates at every future price point and is made available to a user. This information is derived from options price "greeks," which in turn are calculated from real-time options prices.

Knowing the probability of outcome 440 in the context of the expected move consensus allows a user to formulate more informed, rational and precise price target views. A user is thus able to set price target 420 prior to trade strategy selection and execution. This helps reduce irrational sentiment and promotes more disciplined post-trade management, and also sets parameters for more sophisticated trade strategies.

Figure 5:
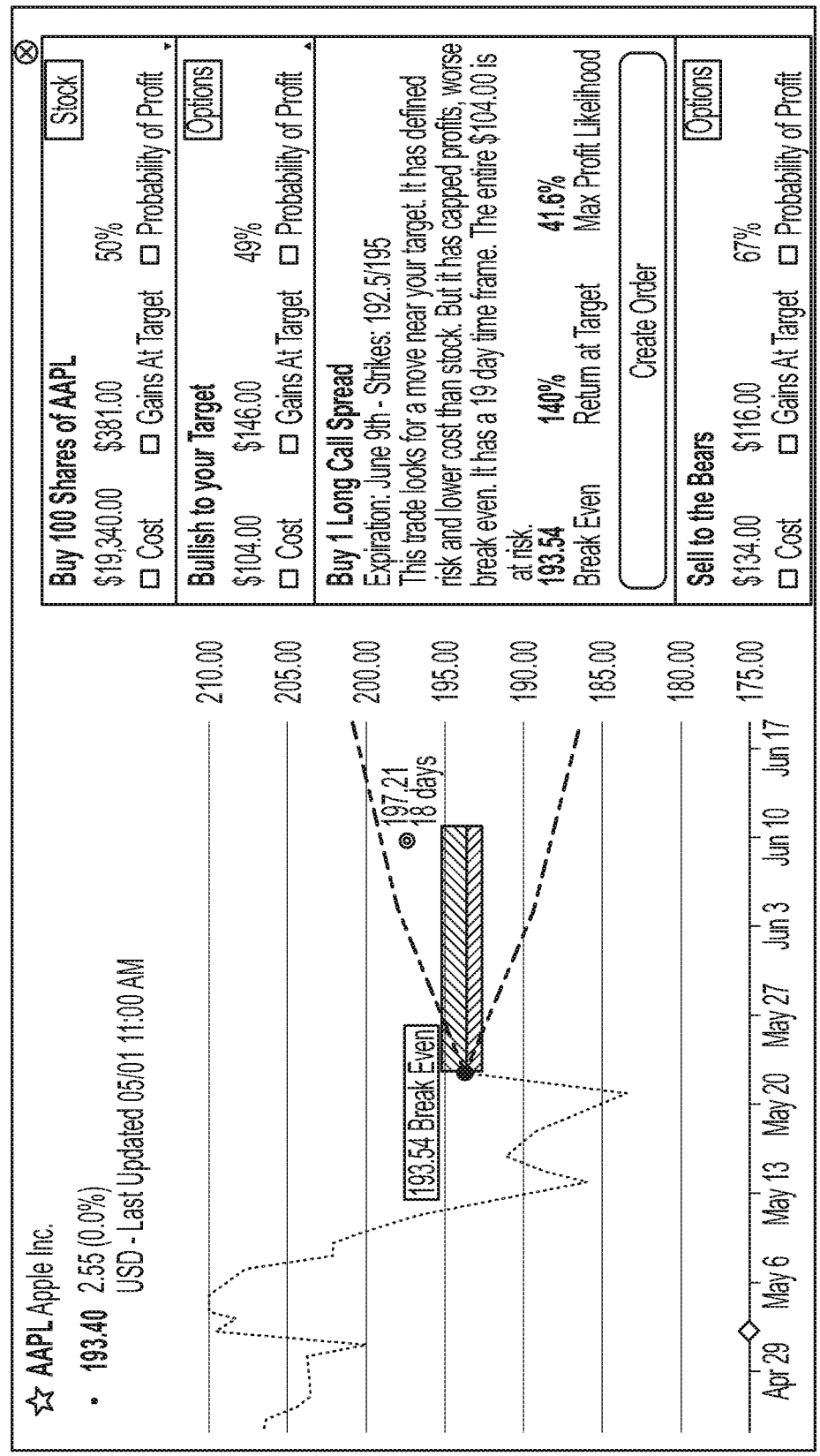
FIG. 5 is an illustration of an exemplary visualization detailing potential strategies in accordance with an embodiment of the invention.
Figure 6:
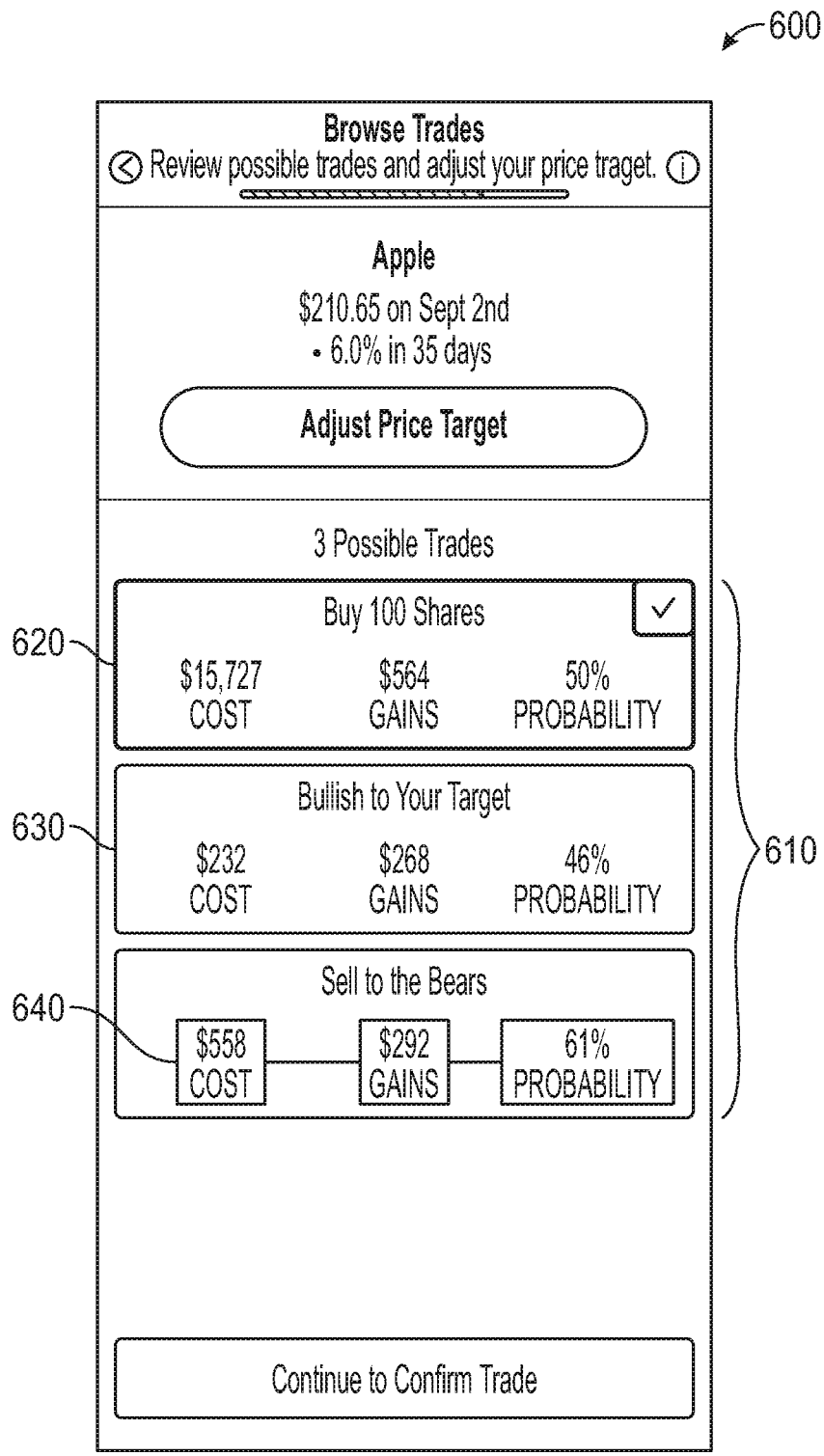
FIG. 6 is another illustration of an exemplary visualization detailing potential strategies in accordance with an embodiment of the invention.

Turning now to FIG. 5, a number of stock and options strategies 500 are presented to the user and generated by a trade generation engine that maps the user's input of price targets 420 and duration target to nearest options strikes and expiries in the options chain. The otherwise manual process of identifying, extracting and combining individual options contracts from the options chain is thus eliminated. Turning to FIG. 6, in another embodiment, alternative strategies 610 are presented to the user simultaneously for ease of comparison, with the respective payout outcomes, mapped back to the expected move values displayed on visualization tool 200. A number of stock and options strategies are generated through a trade generation engine that maps the user's price target 420, and duration target, to nearest options strikes and expiries in the options chain. In one embodiment, the trade generation engine ingests one or more inputs, e.g., price target 420 (from the user), duration or date target (from the user), current price, expected move, and bid/offer of each relevant options contract, and constructs potential trade strategies and presents them to the user. A user may then select one strategy and be presented with adjustable parameter choices (e.g., quantity, limit price, best bid, etc.) from which the user modify the constructed trade. The trade generation engine then constructs (through a process of mapping to bestfit options contracts and price analysis) a range of strategies that may appropriately reflect a user's view. In one embodiment illustrated in FIG. 6, strategies range from buying or selling 100 shares 620, to more complex, multi-leg options strategies 630. The process of constructing multi-leg options strategies is inherently onerous, time-consuming and complex. This embodiment thus provides the user a seamless transition from strategy comparison to a pre-populated ticket, illustrated in FIG. 7. In most existing systems is a user would perform analysis work within one system and subsequently transition to a separate trade ticket system when ready, which would typically require manual trade construction. In this embodiment, both phases are integrated within a single system. The system therefore has the added benefits of eliminating friction and reducing user error, and therefore potentially improving outcomes.

In one embodiment, the alternative strategies illustrated in FIG. 6 are presented in plain English along with key metrics, e.g., metrics 640, which may include cost, gains, and probability outcome 440. In this way, a user is able to generate a number of potential strategies rapidly from a single input. Additionally, a user may evaluate alternative strategies simultaneously side-by-side, without the need for re-initiating the construction process for each strategy type. Strategy selection can be confirmed by the user by via a button or the like (e.g., "Continue to Confirm Trade," as illustrated in FIG. 6).

In one embodiment, the trade generation engine is configured to be operable in conformance with the legal, regulatory, and other requirements of a non-advisory broker dealer. Strategy output may be the direct result of formula calculation, based upon third party inputs described above (e.g., user and external data sources such as an exchange), and absent of any qualitative elements. Traders who might otherwise be limited by time and/or experience are thus able to access strategies that may present superior risk/reward profiles, thereby generally improving potential outcomes. This embodiment is thus available as a "co-pilot" that remains absent of bias and subjectivity, thereby not falling within regulatory definitions of an advisory product. Existing systems circumvent this issue in one of two ways: a) generate a random sample set of generalist strategies that simply reflect a directional view (thereby not specific enough to be construed as advice); or b) separate strategy building engines from broker dealer execution to ringfence it as a stand-alone process. In contrast, these embodiments are both precise and fully integrated into the trade flow.

Figure 7:
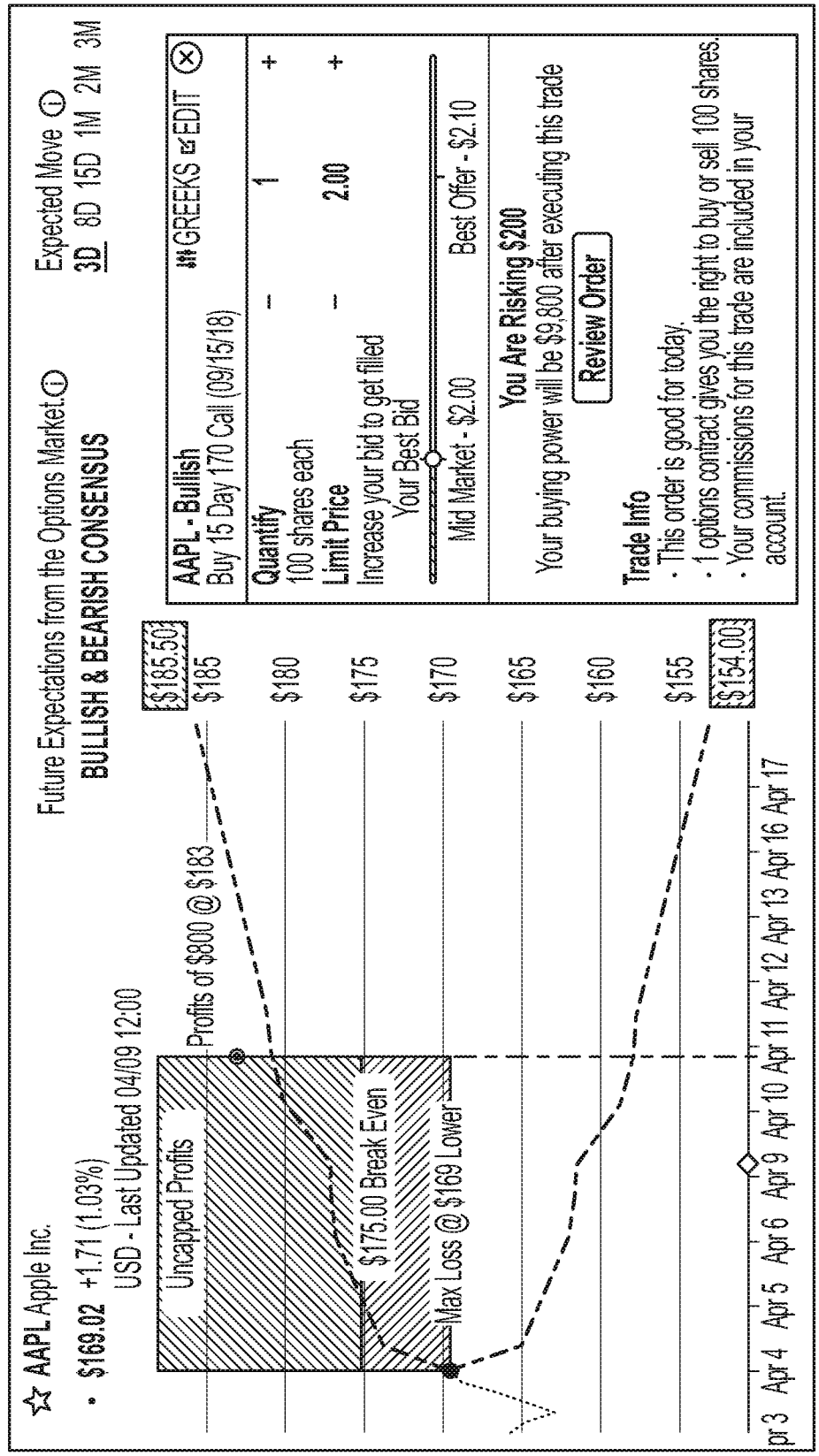
FIG. 7 is an illustration of an exemplary visualization detailing a pre-populated trade ticket for review and execution in accordance with an embodiment of the invention.

Following strategy selection, an order ticket screen 700 is generated, as illustrated in FIG. 7. Order ticket screen 700 provides the user with additional information concerning the proposed order, including for example, dollar amount risked, buying power, trade information, and commission information. Order ticket screen 700 may further include opportunities to adjust the order parameters. e.g., increase or decrease a bid. The order can be confirmed by the user by via a button or the like (e.g., "Confirm Order" as illustrated in FIG. 7). In one embodiment, additional information concerning a trade may be optionally provided, for example, as shown in the "Trade Info" section of FIG. 7.

Figure 8:
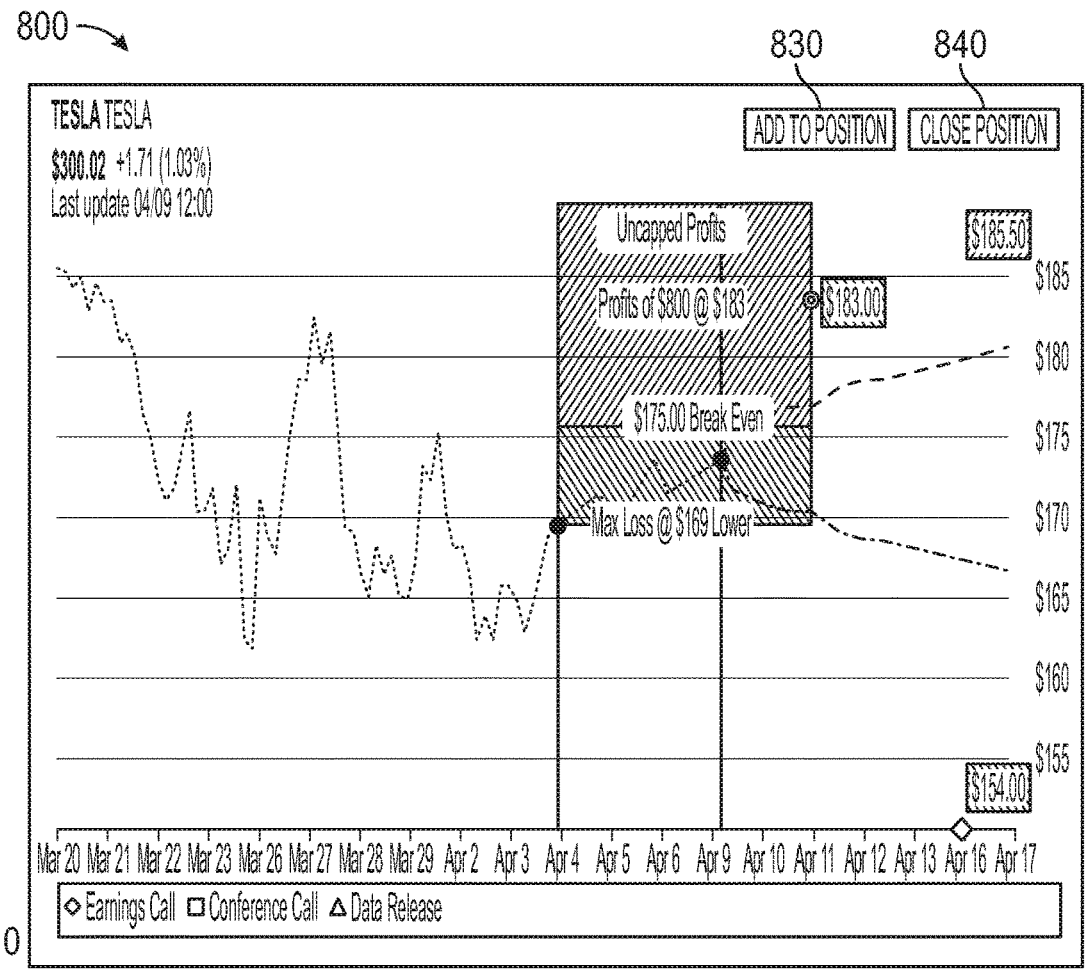
FIG. 8 is an illustration of an exemplary post-trade management visualization detailing further user options in accordance with an embodiment of the invention.

Turning now to FIG. 8, following successful trade execution, the user is able to view and interact with executed trade visualization 800, which illustrates dynamically, in real-time, the evolving payout and probability outcome of the user's executed strategy, and is operable to engage in post-trade management. In one embodiment, a user is able to review an open position in the context of real-time updated probabilities and risk/reward, in the context of the evolving stock price and expected move. Using the executed trade visualization 800 and probability updates as signals for "taking profits" or "cutting losses," provides the potential for overall outcome improvement and reduction of irrational human sentiment. Executed trade visualization 800 may include trade summary information 810, which may in turn include several items of information concerning the executed trade, including creation date, target price/date, trade profile, and/or trade description. Executed trade visualization 800 may also include comparison summary 820, which may include comparison data for various parameters concerning the executed trade at the time it was created, and currently. These parameters may include, for example, days to expiry, trade price, current returns, likelihood of breakeven, and likelihood of target.

FIG. 9 is a detail view of a template for trade summary information 810 and comparison summary 820. Returning to FIG. 8, executed trade visualization 800 may further include options for the user to, e.g., add to the identified position 830, or close the position 840. Incorporating dynamic visualizations of trade payouts and outcome probabilities on the same graphical interface as used to construct the trade is a new method of assisting with post-trade management.

Figure 10:
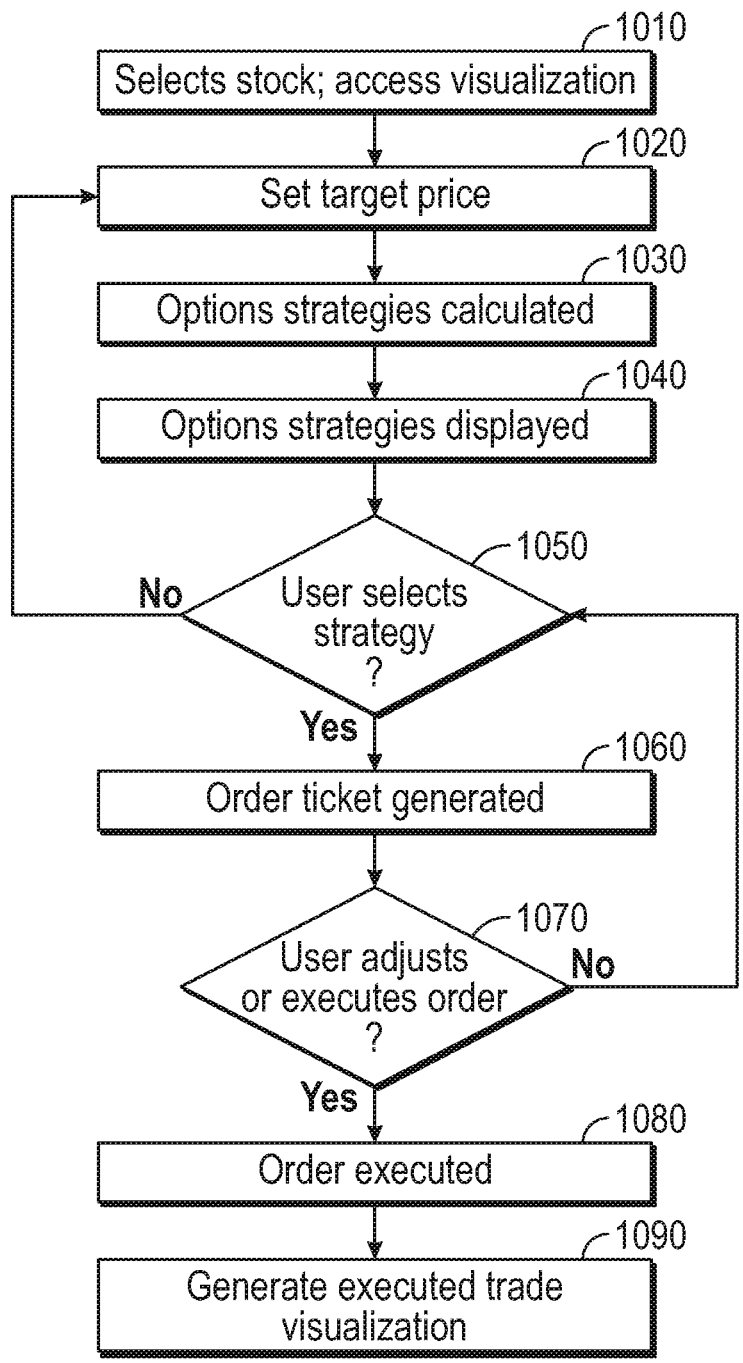
FIG. 10 is a diagram of input and data processing steps in an embodiment of a method of the invention.

Turning to FIG. 10, a flow diagram illustrating a method of constructing and comparing options trade strategies (spreads) from a single user input according to an embodiment of the invention is shown. In step 1010, a user selects a company or stock and accesses visualization tool 200. In step 1020, the user sets a price target by selecting a location on the graph of expected move rendered on visualization tool 200. In step 1030, suitable options spread strategies are calculated reflecting at least one user input by iteratively mapping current stock price; expected price move and the user price target to nearest options contracts in the options chain. In one embodiment, respective payout outcomes are mapped back to the expected move chart. In step 1040, suitable options spread strategies are presented to the user for comparison and evaluation. In step 1050, the user selects one or more suitable options spread strategies. In step 1060, a pre-populated order ticket is generated. In step 1070, the user confirms that the order be executed. In step 1080, the order is executed. In step 1090, an executed trade visualization is generated. Additional steps may further be available in some embodiments, including viewing, comparing, canceling and/or changing a position via the executed trade visualization. In one embodiment, a user may optimally return to an earlier screen to, e.g., select a company or stock and accesses visualization tool 200 (e.g., step 1010) at any stage in the process by selecting a "back." "return" or "start over" option in a search screen or menu screen.

Figure 11:
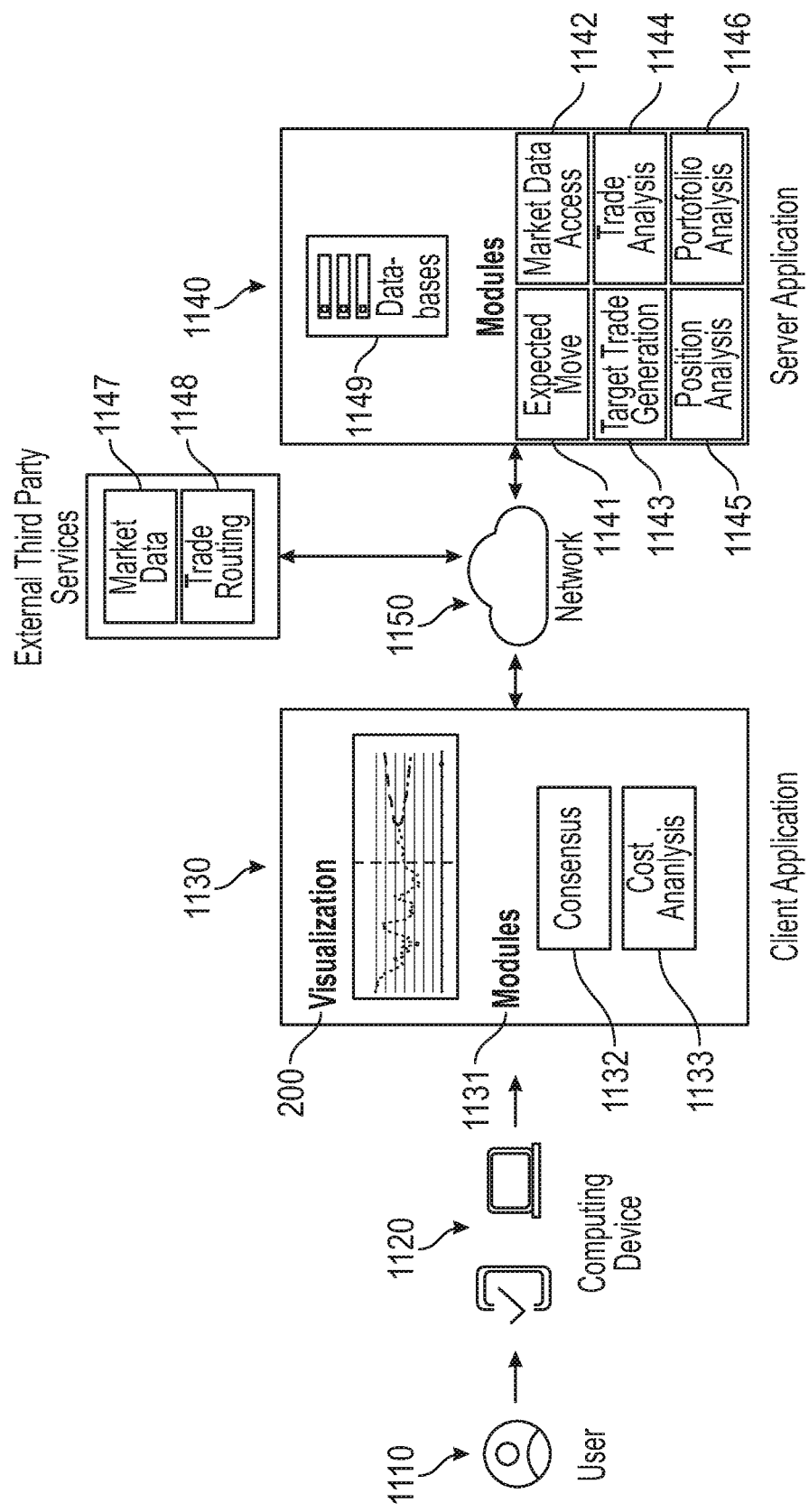
FIG. 11 is an illustration of system architecture in accordance with one embodiment of the invention.

Referring now to FIG. 11, an exemplary computer system 1100 for use in an implementation of an embodiment of the invention will now be described. In computer system 1100, user 1110 accesses the features of computer system 1100 via a computing device 1120, on which is running client application 1130. Client application 1130, in one embodiment, includes modules 1131 operable to create and display data on visualization tool 200 on computing device 1120.

Modules 1131 may include, in one embodiment, consensus module 1132, which calculates and maintains the expected move of a given security on a regular basis. Consensus module 1132 calculates the expected move by identifying the straddle and dampening the price of the straddle by a percent value. This percent value "dampening" value is predefined and coded into expected move module 1141, operating on server-side application 1140, and provided to consensus module 1132 via network 1150, which may be the Internet, or local or wide-area network. Expected move module 1141 calculates and maintains, on a regular basis, the expected move calculation of all tracked securities.

Consensus module 1132 adds the expected move calculated by expected move module 1141 to the latest stock price in order to provide the "bullish" consensus (as shown on, e.g., FIG. 2). Consensus module 1132 subtracts the expected move calculated by expected move module 1141 from the latest stock price in order to provide the "Bearish" consensus (as shown on. e.g., FIG. 2). Consensus module 1132 generates this calculation for all available option expiration dates and interpolates for any date/times in between. This data is displayable in a graph or chart provided by visualization tool 200.

Consensus module 1132 requests and receives stock and option price data from market data access module 1142, operating on server-side application 1140. Market data access module 1142 requests, receives, and formats market data from one or more market data services 1147 and transmits such data, or formats and transmits data, to other modules within the computer system 1100, including consensus module 1132.

Market data service 1147 may be a commercially-available service (e.g., provided by Bloomberg, DxFeeds, ACTIV Financial, etc.) that provide real-time and historic market and trade-related data and analytics, including, e.g. price, ask/bid, Greeks, and volume. In one embodiment, market data access module 1142 requests historic price, current price, and options data about a security from market data service 1147 by transmitting a request via a global computer network such as the Internet, and receives the requested data back. This data may also be streamed.

Turning back to client application 1130, whenever the system needs to display a trade cost, e.g., in connection with calculating and displaying potential strategies or generating an order ticket (as shown in FIG. 10), cost analysis module 1133 requests prices from market data access module 1142. In one embodiment, market data access module 1142 requests relevant price data (e.g., National Best Bids & Offers data) and returns the data to cost analysis module 1133 for use in calculating the cost of executing a potential order and display to the user.

As described above, visualization tool 200 displays a range of data for a given security via a set of interactive charts. These may include, for example, historic securities prices, current securities prices, the bullish and bearish consensus and corporate actions such as earning events. The user interacts with visualization tool 200 to, e.g., explore future price targets, identify the likelihood of a security reaching a given target, set a target price and date in the future. For a specified trade, visualization tool 200 is operable by a user to identify and display zones of profit and loss, and levels that identify trade breakeven and maximum profit or loss. For post-trade management, visualization tool 200 is operable by a user to identify and display zones of profit and loss, and levels that identify trade breakeven and maximum profit or loss in conjunction with the updated stock price and updated expected move, as determined by the options prices. In one embodiment, visualization tool 200 communicates with market data access module 1142 to retrieve historical and current price data, likelihoods of future price targets, and corporate events. Visualization tool 200 may also communicate with consensus module 1132 and expected move module 1141 to generate the expected move and future likelihoods for a given security. Visualization tool 200 may also communicate with target trade generation module 1143 to transmit the user's selected price and date target and zone information.

When provided with a target (symbol, price, date), target trade generation module 1143 determines the most suitable trades and their variants. For each trade/variant, target trade generation module 1143 computes instructions and attributes for each (legs, strikes, etc.) In one embodiment, visualization tool 200 transmits a packet of information to target trade generation module 1143 including security ticker identifier, target price, target date, and target zone, as selected in full or part by the user. In one embodiment, expected move module 1141 validates the target zone and communicates the validation or lack of validation to target trade generation module 1143. If validated, target trade generation module 1143 then generates a list of one or more appropriate trades (e.g. "variants") and corresponding details appropriate for each trade (e.g., date and strikes). Target trade generation module 1143 then communicates the attributes of the generated trade(s) (price, cost, gain at target, and likelihood) to trade analysis module 1144.

Trade analysis module 1144, upon receiving attributes of the generated trade(s) (price, cost, gain at target, and likelihood) from trade analysis module 1144, calculates attributes such as maximum loss, maximum profit, current value, likelihood of maximum loss, likelihood of maximum gain and likelihood of breakeven, for each given trade. Trade analysis module 1144 may request and receive relevant market information from market data access module 1142 as may be required. The results of the calculations conducted by trade analysis module 1144 are then transmitted back to client application 1130 for display to the user.

When a valid order or instruction is approved by the user on client application 1130, order details are transmitted to trade routing service 1148, an external service, via a global computer network such as the Internet. Examples of trade routing service 1148 include commercial services that route and track the status of customer orders to exchanges and liquidity providers, such as Orbis, Sterling, ETNA, and others. After receiving an order or instruction, trade routing service 1148 responds to client application 1130 with the status of the order or instruction. Trade routing service 1148 may also respond to requests from position analysis module 1145 and portfolio analysis module 1146. Position analysis module 1145 calculates and transmits to client application 1130 analytics and metrics on a user's individual position (such as price, gains, losses, etc.). Position analysis module 1145 requests trade attributes from trade routing service 1148 the trade's details (such as profit/loss, breakeven and probabilities). This data, in one embodiment, is used by position analysis module 1145 to augment trade details, such as profit/loss data, breakeven point, and probabilities. Portfolio analysis module 1146 aggregates individual analyses of positions created by position analysis module 1145 for each user, and calculates summary metrics for the user's overall portfolio and account. In one embodiment, portfolio analysis module 1146 accesses a user's account details and portfolio balances from one or more databases 1149. In one embodiment, database 1149 stores user account data and security features, bibliographic information, portfolio details, current positions, historical trade information, etc. Databases 1149 may include suitable non-transitory computer-readable media, such as optical or magnetic disks, fixed disks with magnetic storage (hard drives), flash memory, tapes accessed by tape drives, and other storage media, and other software programs such as operating system 1160.

Computer system 1100 may further include one or more additional modules for such functions as prompting user to input required data for initial setup of a new account and sending to database 1149, including selection of an initial companies or stocks to evaluate; retrieving index and options data from market data service 1147, generating visualizations described herein based on index and options data; exchanging data with other systems, systems for administration of products during a payout phase, and other accounting systems; generating statements: furnishing data to printing and mailing systems, web servers and other systems for client communications; visualizing data from calculation and generation systems; processing of position changes or withdrawals; and other functions.

Computing device 1120 may further include one or more processors. The term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

The processor(s) communicate, such as through bus and/or other data channels, with network interface units, memory, storage devices and input/output controllers. Via input/output controllers, processors may receive data from a user who inputs such as pointing devices (including mice and trackballs), touch screens, audio inputs and keyboards, and may provide data to outputs, such as data to video drivers for formatting on displays, data to print drivers for transmission for printing in hard copy or to image files, and data to audio devices.

Storage devices are configured to exchange data with processors, and may store programs containing processor-executable instructions, including instructions for implementing calculations employing algorithms, such as algorithms for determining options data, and values of variables, such as index values and associated anniversary dates, dates of beginning and ending of contract periods, etc., for use by the modules described above.

Processors may also be configured to perform steps in accordance with processor-executable instructions. Processors may be configured to access data from storage devices, which may include connecting to storage devices and obtaining data or reading data from the storage devices, or storing new and updated data into the storage devices. Storage devices may include local and network accessible mass storage devices. Storage devices may include media for storing operating system and mass storage devices for storing databases 1149.

Still referring to FIG. 11, in an embodiment, computing device 1120 may further have inputs including user interfaces, workstations having keyboards, touch screens, pointing devices such as mice and trackballs, or other user input devices, connected via networked communications to a processor.

In some embodiments, a user may send instructions via computing device 1120 to cause computer system 1100 to take actions, such as processing position changes, calculating potential trades, selecting companies or stocks to evaluate, execute positions selected, and other actions.

Client application 1130 and server application 1140 may further include one or more engines or modules that may be utilized to perform one or more steps or functions of the various embodiments described herein. In one embodiment, one or more modules of a computer software program in combination with one or more components of hardware are implemented. Such software programs may be used when a system user sends a request for data or information to server application 1140, and comprises part of the processing done on the server-side of the network. Such software programs may also operate, such as on a daily basis, to perform batch processing of data related to accounts, or options contracts. For example, a daily batch run may include identifying all options contracts that have reached a target date and determining updated account values.

Client application 1130 and server application 1140 may be used in an Internet environment, where the server is a web server and the request is formatted using HTTP (or HTTPS). Alternatively, the server may be in a corporate intranet, extranet, or any other type of network. Use of the term "Internet" herein, when discussing processing associated with the user's request, includes these other network environments, unless otherwise stated. Additionally, a graphical user interface or other module may be implemented as an intelligent hardware component incorporating circuitry including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. One or more functions of a web client or other module may be implemented as application software in the form of a set of processor-executable instructions stored in a memory of computing device 1120.

Databases 1149 may be implemented in one or more physical data storage devices in communication with client application 1130, server application 1140, or may be implemented in remote data storage devices accessible over one or more networks, such as cloud computer servers accessible via the Internet. Databases in communication with server application 1140 may include both internal and/or external/third party databases. By way of example, external databases may include databases maintained by government agencies and commercial entities providing price data, financial services data providers.

Server application 1140 may be configured for bulk download or upload of data, such as bulk download of index data on a second-by-second, minute-by-minute, or daily basis from market data service 1147. Such data may be furnished such as via a spreadsheet file or via suitable xml documents, by way of example. Data may be exchanged between server application 1140 and one or more legacy systems via suitable middleware systems. One or more modules may be configured to perform data validation steps prior to storing bulk data in one or more databases 1149. Server application 1140 may further be configured to permit bulk upload or download of data, such as portfolio data of clients of a broker or financial services retailer, to a device of suitably-authorized user.

In operation, server application 1140 is in communication with client application 1130, via network 1150, which facilitates interaction with server application 1140 through one or more user interfaces including graphical user interfaces. As used herein, computer device 1120, client application 1130, and server application 1140 may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

A user using computing device 1120 and accessing client application 1130, such as an account owner, may view index and/or options data, initiate strategy comparisons, and initiate transactions, such as selection of trades or changes or withdrawals in position. Computer system 1100 may be further configured to prompt the user for available actions, such as generating forecasts of future account value based on various assumptions as to index returns and inflation; permitting instructions for position changes or withdrawals; and other actions.

Data indicative of instructions input by a user on computing device 1120 may be implemented in accordance with processor-executable instructions. Alternatively, client application 1130 and/or server application 1140 may be configured to generate data indicative of web documents for display on computing device 1120, and to verify instructions prior to commencement of processing. Client application 1130 and/or server application 1140 may further generate data for transmission to computing device 1120, which is displayed by an application program to confirm that an instruction has been received and is being implemented. Client application 1130 and/or server application 1140 may be configured to confirm such activities in other manners, such as by sending electronic e-mail or text messages, sending instructions for printing and mailing of physical letters to account owners, and other suitable methods.

By way of further example, client application 1130 may be configured to generate and display administration system screens on computing device 1120 to a user. The administrative system may show account owner, beneficiary and broker information, as stored in database 1149. This information may be reviewed, verified or updated, such as on issuing of a ticket, or in response to a telephone inquiry from an account owner or broker dealer.

In embodiments of the present invention, one or more of the above modules, may also be implemented in combinations of software and hardware for execution by various types of computer processors coupled to such hardware.

As used herein, a module of executable code may, for instance, comprise one or more physical or logical blocks of computer instructions which may, for instance, be organized as an object, procedure, process or function. Nevertheless, the executables of an identified module need not be physically located together, but may comprise separate instructions stored in different locations which, when joined logically together, define the module and achieve the stated purpose for the module such as implementing the determination of amounts to be credited to an account responsive to receipt of data indicative business rules logic prescribed by the present system. In embodiments of the present invention, a module of executable code may be a compilation of many instructions, and may be distributed over two or more different code partitions or segments, among different programs, and across two or more devices. Similarly, data, including by way of example options data, may be identified and illustrated herein within modules, and may be embodied in any suitable form and organized within any suitable type of data structure. Such data may be collected as a single data set, or may be distributed over different locations including over different storage devices, and may exist, at least partially, merely as electronic signals on a system and/or network as shown and described herein.

A processor may provide the central processing unit (CPU) functions of a computing device on one or more integrated circuits. The term "processor" may include multi-core processors and central processing units including multiple microprocessors. The central processing unit functionality may be provided at one or more remote locations, such as through application service provider and cloud computing services.

In some embodiments, a processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet. Output signals may include, by way of example, data identifying formats, fields, and content of fields. Signals may be compatible with any appropriate format. For example, data may be formatted in accordance with a data format for insurance data, such as an ACORD compatible format, or a non-ACORD xml format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system on which the methods of embodiments of the present invention may be implemented includes at least one central processing computer or computer network server. A network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, a network server may be a standalone server computer or alternatively, the functions of a network server may be distributed across multiple computing systems and architectures.

A network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include hard magnetic disk drives, optical storage units. CD-ROM drives, or flash memory, by way of example. Data storage devices contain databases 1149 used in processing calculations embodied in algorithms, including data for display on computing devices 1120. In one embodiment, database software creates and manages these databases 1149.

The functions described above are merely exemplary and should not be considered exhaustive of the type of function which may be performed by the computer program code of embodiments of the present inventions.

The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, non-transitory media, tangible media, volatile media, and transmission media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of embodiments of the present invention may also interact and/or control one or more user devices or terminals. The user device or terminal may include any one or a combination of a personal computer, a mouse, a keyboard, a computer display, a touch screen. LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc.).

While particular embodiments of the invention have been illustrated and described, various modifications and combinations can be made without departing from the spirit and scope of the invention, and all such modifications, combinations, and equivalents are intended to be covered and claimed.

The foregoing is intended to provide a brief, general description of an illustrative and/or suitable exemplary environment in which embodiments of the described present invention may be implemented. This is exemplary of a suitable environment and not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that the embodiments discussed herein are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above.

The systems and methods described above could be used in a wide variety of use cases and is not confined to use as a broker dealer graphical user interface. The system could, for instance, become a standard methodology for banks or regulators to analyze and assess position risk, or for auto-trading based on pre-defined user criteria. The methodology could also be applied to a wide range of other securities, such as currencies (fiat and crypto) and commodities. One skilled in the art will appreciate further features and advantages of the illustrated embodiments based on the above-described embodiments. Accordingly, the illustrated embodiments are not to be limited by what has been particularly shown and described, except as indicated by the appended claims.

We claim:

1. A computer-implemented method of aggregating options market data from one or more remote market data services over a network and distributing an options market information visualization tool to a remote user computer for analyzing the aggregated options market data and constructing trade strategies by selecting a price target from a real-time expected move chart, comprising the steps of:
   aggregating, via a transmission server comprising a central processing unit and a server communication transceiver, options market data from one or more remote market data services and storing the options market data in a non-transitory storage medium;
   distributing to the remote user computer the options market information visualization tool comprising an interactive graphical user interface;
   displaying on a display associated with the remote user computer the interactive graphical user interface, featuring:
      a company's identifying information, ticker symbol, current stock price, and daily stock price change or percent change;
      one or more event indicators in association with one or more event dates, wherein the one or more event indicators each comprises a symbol;
      a plurality of pre-populated time periods for which to calculate the current stock price's expected move, wherein the pre-populated time periods comprise a plurality of dates;
      an adjustable price target; and
      a real-time expected move chart;
   selecting, using an expected move selector operable by a user via the remote user computer, from among the plurality of pre-populated time periods and the adjustable price target to create a hypothetical trade scenario;
   transmitting the user selections over a network to a consensus module that, in response to receiving the user selections, accesses the aggregated options market data and calculates a bullish consensus expected move and a bearish consensus expected move from options prices for the selected time period and formats the bullish consensus expected move and the bearish consensus expected move for concurrent display in graphical and numerical form on the real-time expected move chart;
   concurrently displaying on the real-time expected move chart the bullish consensus expected move, and the bearish consensus expected move in graphical and numerical form;
   identifying nearest options strikes and expiries in an options chain and payout outcomes;
   mapping the adjustable price target to the nearest options strikes and expiries and displaying on the real-time expected move chart; and
   dynamically updating the real-time expected move chart in response to the consensus module receiving additional user selections.

2. The computer-implemented method of claim 1 comprising the further steps of:
   constructing a trade based on the user selections;
   generating a pre-populated order ticket to execute the trade;
   displaying the pre-populated order ticket on the graphical user interface;
   receiving instructions to execute an order represented by the pre-populated order ticket; and
   executing the order.

3. A system for aggregating options market data from one or more remote market data services over a network and distributing an options market information visualization tool to a remote user computer for analyzing the aggregated options market data and constructing trade strategies by selecting a price target from a real-time expected move chart, comprising:

a transmission server comprising a central processing unit and a server communication transceiver that aggregates options market data from one or more remote market data services and stores the options market data in a non-transitory storage medium;

an options market information visualization tool comprising an interactive graphical user interface distributed to the remote user computer, the interactive graphical user interface displaying on a display associated with the remote user computer:
 a company's identifying information, ticker symbol, current stock price, and daily stock price change or percent change;
 one or more event indicators in association with one or more event dates, wherein the one or more event indicators each comprises a symbol;
 a plurality of pre-populated time periods for which to calculate the current stock price's expected move, wherein the pre-populated time periods comprise a plurality of dates;
 an adjustable price target; and
 a real-time expected move chart that dynamically updates in response to user selections from among the plurality of pre-populated time periods and the adjustable price target;

an expected move selector operable by a user via the remote user computer to make user selections from among the plurality of pre-populated time periods and the adjustable price target to create a hypothetical trading scenario; and a consensus module that in response to receiving the user selections from among the plurality of pre-populated time periods and the adjustable price target transmitted over a network from the remote user computer following inputs by the expected move selector, accesses the aggregated options market data, calculates a bullish consensus expected move and a bearish consensus expected move from options prices for the time period selection; formats the bullish consensus expected move and the bearish consensus expected move for concurrent display in graphical and numerical form on the real-time expected move chart, then causes the bullish consensus expected move and the bearish consensus expected move to be displayed on the interactive graphical user interface real-time expected move chart on the remote user computer, and thereafter dynamically updated in response to receiving additional user selections.

4. The system of claim 3, wherein the consensus module calculates the bullish consensus expected move by extracting at-the-money (ATM) call and put options prices; and applying a dampener.

5. The system of claim 3, wherein the interactive graphical user interface further displays a chart illustrating the stock past performances.

6. The system of claim 3, wherein the adjustable price target is selected based on a market sentiment input.

7. The system of claim 3, wherein the interactive graphical user interface further displays an expiry date or a duration target.

8. The system of claim 3, wherein the hypothetical trading scenario comprises a date axis and a price axis, the adjustable price target, and a percent higher or lower the adjustable price target compared to the current stock price and a probability of outcome calculated from options price greeks.

9. The system of claim 3, wherein the interactive graphical user interface further maps the adjustable price target and the duration target to nearest options strikes and expiries in an options chain.

10. The system of claim 7, further comprising:
 a trade generation engine that constructs one or more trade strategies in response to receiving one or more of the adjustable price target, the duration target, or the expiry date target; the current stock price; and the current stock price's expected move; and formats the one or more trade strategies for display on the interactive graphical user interface; obtains bid/offer data for each options contract over a network from one or more remote market data services; generates adjustable parameter choices comprising at least one of quantity, limit price, and best bid for display on the interactive graphical user interface; receives a user selection from among the adjustable parameter choices; maps to bestfit options contracts and price analysis to construct a trade based on the user selection from among adjustable parameter choices; generates a pre-populated ticket to execute the trade; and formats the pre-populated ticket for display on the interactive graphical user interface.

11. The system of claim 10, wherein the one or more trade strategies comprises a multi-leg options strategy.

12. The system of claim 10, wherein the trade generation engine adjusts the pre-populated ticket following receipt of a user instruction to increase or decrease the best bid; generates an adjusted pre-populated ticket; and formats the adjusted pre-populated ticket for display on the interactive graphical user interface.

13. The system of claim 12, further comprising: a trade execution module that executes a trade based upon the adjusted pre-populated ticket.

14. The system of claim 13, wherein the interactive graphical user interface further displays: evolving payout and probability outcomes of the executed trade dynamically calculated by a position analysis module; trade summary information concerning the executed trade comprising at least one of creation date, target price/date, trade profile, and trade description; and comparison data for the executed trade comprising at least one of days to expiry, trade price, current returns, likelihood of breakeven, and likelihood of target.

15. The system of claim 14, wherein the trade execution module, upon receiving a post-trade instruction to add to a position or close a position from the user via the remote user computer executes the post-trade instruction.

* * * * *

UNITED STATES PATENT AND TRADEMARK OFFICE
CERTIFICATE OF CORRECTION

| | | |
|---|---|---|
| PATENT NO. | : 11,908,007 B2 | |
| APPLICATION NO. | : 16/995068 | |
| DATED | : February 20, 2024 | |
| INVENTOR(S) | : John L. Foley et al. | |

It is certified that error appears in the above-identified patent and that said Letters Patent is hereby corrected as shown below:

On the Title Page

Item (71) Applicant and Item (73) Assignee should be corrected to read:
Options AI, Inc.

Signed and Sealed this
Ninth Day of July, 2024

Katherine Kelly Vidal
*Director of the United States Patent and Trademark Office*